April 20, 1965 D. B. WIENS 3,179,305
SILAGE FEEDER AND MIXER
Filed May 1, 1962 3 Sheets-Sheet 1
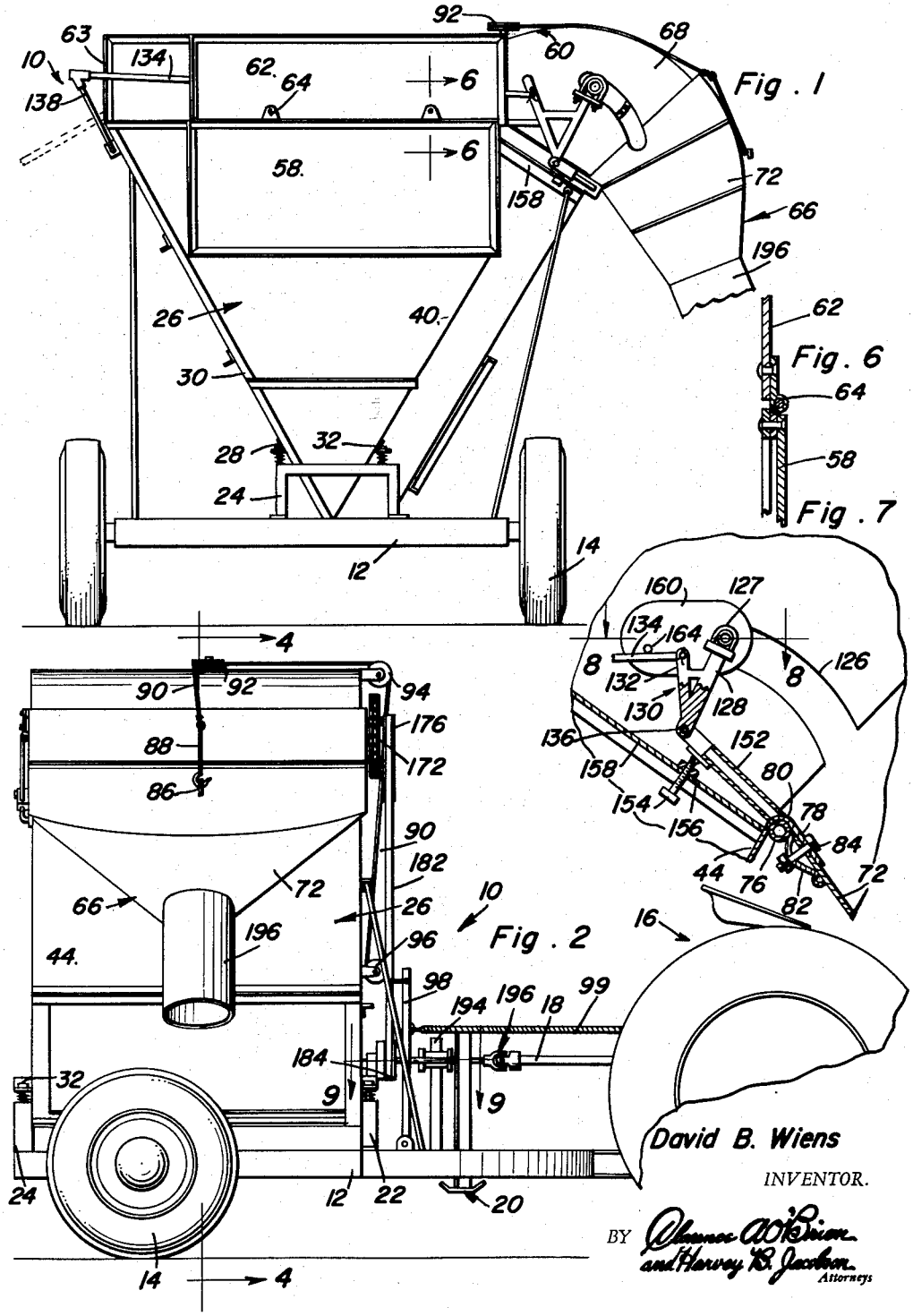
David B. Wiens
INVENTOR.

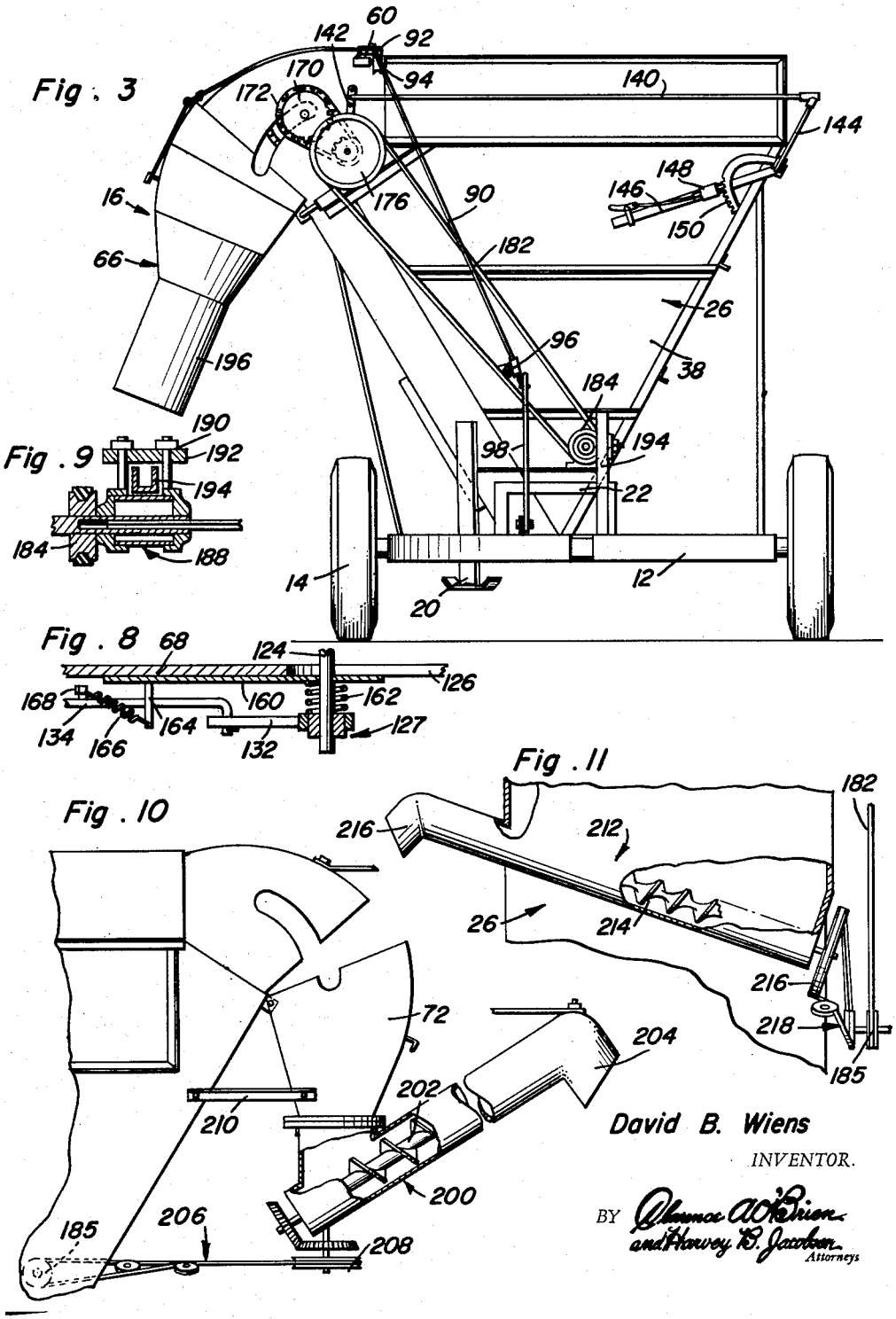

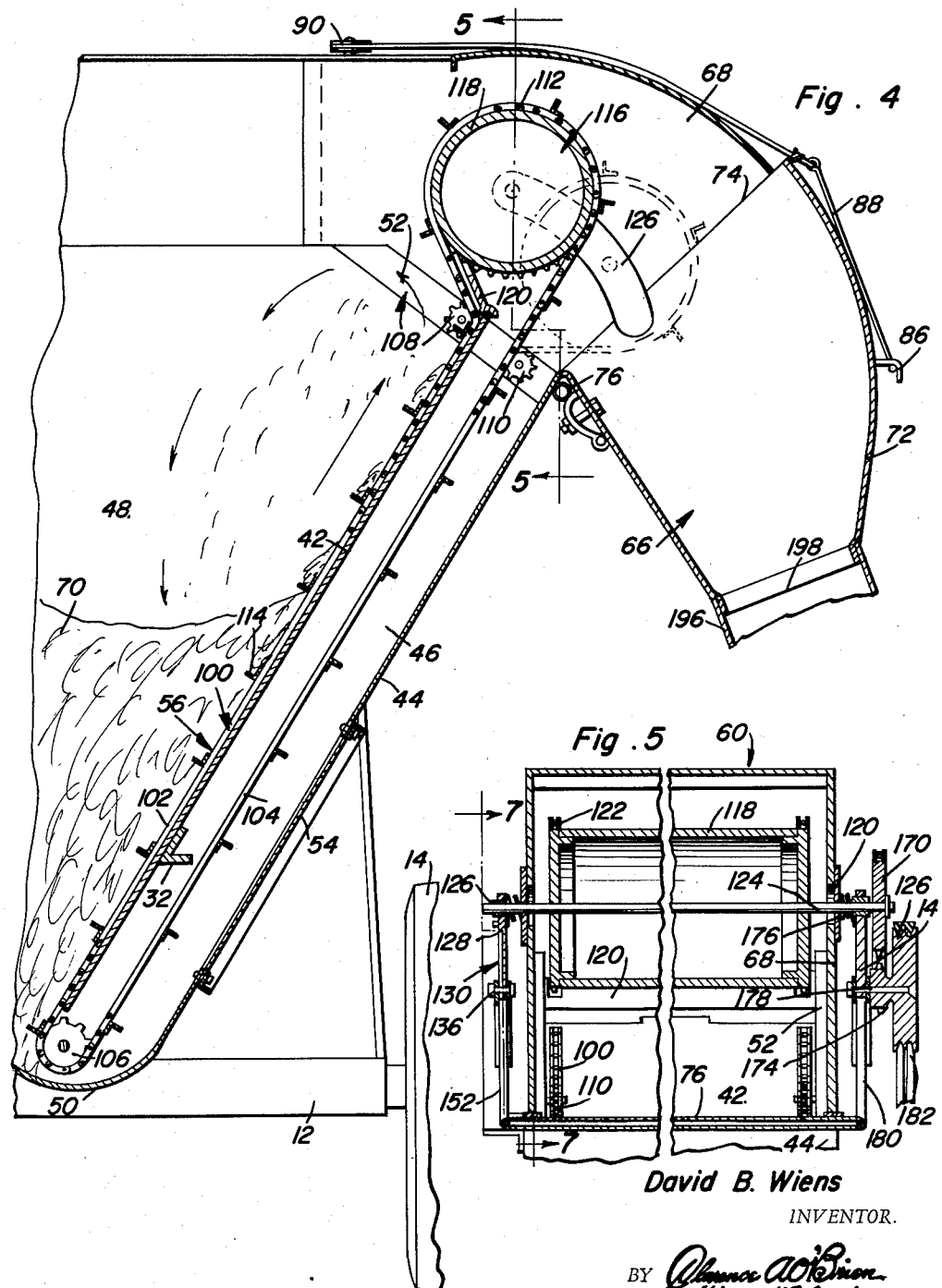

United States Patent Office 3,179,305
Patented Apr. 20, 1965

1

3,179,305
SILAGE FEEDER AND MIXER
David B. Wiens, R.F.D., Hillsboro, Kans.
Filed May 1, 1962, Ser. No. 191,606
13 Claims. (Cl. 222—288)

The primary object of the present invention is to provide a silage mixer and feeder wherein materials disposed within a hopper or storage box may be continuously conveyed upwardly for gravity discharge through a spout with a certain proportion of the materials being recirculated for mixing purposes. The proportion of the material being recirculated may in accordance with the principles of the present invention be varied so as to vary the discharge rate and accommodate the type of materials being handled.

Another object of the present invention is to provide a mixing and feeding device capable of accomplishing both the mixing and feeding function through use of a single conveyor mechanism and within a hopper having but a single compartment for the material.

A further object of this invention is to provide a novel conveyor mechanism whereby the material within a hopper may be mixed and fed to a delivery spout in any proportion without complex drive controlling mechanism and without a plurality of conveyor devices and hopper compartments.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a rear elevational view of the silage feeder and mixer device of the present invention.

FIGURE 2 is a side elevational view of the device illustrated in FIGURE 1.

FIGURE 3 is a front elevational view of the device illustrated in FIGURE 1.

FIGURE 4 is an enlarged partial sectional view taken substantially through a plane indicated by section line 4—4 in FIGURE 2.

FIGURE 5 is a sectional view taken substantially through a plane indicated by section line 5—5 in FIGURE 4.

FIGURE 6 is a partial sectional view taken substantially through a plane indicated by section line 6—6 in FIGURE 1.

FIGURE 7 is a partial sectional view taken substantially through a plane indicated by section line 7—7 of FIGURE 5.

FIGURE 8 is a partial sectional view taken substantially through a plane indicated by section line 8—8 in FIGURE 7.

FIGURE 9 is a partial sectional view taken substantially through a plane indicated by section line 9—9 of FIGURE 2.

FIGURE 10 is a partial rear elevational view with parts broken away and shown in section of a modified form of device.

FIGURE 11 is a partial side elevational view with parts broken away and shown in section of a second modified form of device.

Referring now to the drawings in detail, it will be observed from FIGURES 1, 2 and 3, that the feeder and mixer device of the present invention is generally referred to by reference numeral 10. The device 10 is mounted on a trailer frame generally referred to by reference numeral 12 supported by a pair of wheels 14 and towed rearwardly of a tractor-like vehicle 16 from which the device is powered by means of a power take-off shaft 18 extend-

2 ing rearwardly of the vehicle 16. The trailer frame 12 is therefore provided with any suitable type of anchoring jack mechanism generally referred to by reference numeral 20 by means of which the trailer frame 12 may be anchored and supported in proper position above the ground should the device 10 be uncoupled from the towing vehicle 16.

Mounted on the trailer frame between a forward support frame 22 and a rear support frame 24, is a material storage hopper assembly generally referred to by reference numeral 26. The hopper 26 is adjustably mounted by means of two frame members including angle iron member 28 fixed to the side 30 of the hopper 26 adjacent the lower or bottom end thereof and extending longitudinally of the trailer vehicle frame 12, with the second angle iron frame member 32 disposed parallel to the frame member 28 and projecting through the hopper assembly 26 so that both of the frame members 28 and 32 overlie the forward and rear support frames 22 and 24. Each of the angle frame members is therefore properly spaced above the end support frames 22 and 24. The hopper assembly 26 is thereby supported with its bottom end terminating slightly below the top of the trailer frame 12 and is also symmetrically located thereon as seen in FIGURES 1 and 3 with the angle frame member 32 extending through the front wall 38 and the rear wall 40 of the hopper assembly 26 and also internally secured to a wall 42 inside of the hopper.

As more clearly seen in FIGURE 4, internally mounted within the hopper assembly 26 between the front and rear walls 38 and 40, is the partition support wall 42 that is spaced from and extends parallel to the side wall 44 of the hopper assembly. Accordingly, defined between the walls 42 and 44 is a conveyor return space 46 while the material storing chamber 48 is defined between the partition wall 42 and side wall 30. The partition wall 42 extends from a point spaced above the bottom end of the hopper assembly and terminates at a pair of sprocket mounting members 52 located at the upper end of the hopper assembly and connected to the side wall 44. In the side wall 44, close to the bottom end 50 is a removable access panel 54 by means of which the return space 46 is exposed in order to make repairs on the material conveyor assembly generally referred to by the reference numeral 56 which is located within the hopper assembly. Also provided on the rear wall 40, of the hopper assembly, is a removable panel 58. Located above the hopper assembly 26 is a hood assembly generally referred to by reference numeral 60 constituting a vertical extension of the hopper assembly and forming a closure for a discharge portion. In order to provide access to the hopper for loading thereof with materials, the hopper assembly is provided with a side loading panel 63 and a rear loading panel 62 as more clearly seen in FIGURES 1 and 6. The loading panel 62 is hingedly mounted on a hopper frame member which passes behind the removable panel 58 of the hopper, by means of hinges 64 so that when the panel 62 is folded back, loading of the hopper may be accomplished with a minimum of spillage. The fixed portions of the hood assembly 60 will prevent loss of materials because of wind.

A discharge spout assembly generally referred to by reference numeral 66 is pivotally mounted at the upper end of the hopper assembly adjacent the wall 44 thereof that cooperates with the portion 68 of the hood assembly 60 to form an enclosed feed passage by means of which the material 70 within the hopper chamber 48 may be unloaded. The discharge assembly 66 includes a transition passage portion 72 having an inlet 74 as more clearly seen in FIGURE 4. The inlet end 74 may be positioned to overlie the outlet end of the hood portion 68. However, the discharge assembly may also be pivotally separated from the hood portion 68 when it is desired to vary the discharge angle. A transversely extending tubular pivot member 76 is therefore mounted on the lower wall of the transition passage member 72 to form the pivotal mounting axis for the discharge assembly. As more clearly seen in FIGURE 7, the pivot member 76 is secured to the passage member by means of a pair of strap elements 78 on opposite sides thereof that extend thereover and are received within slots 80 formed at the upper end of the hopper wall 44. The pivot member 76 is securely wedged between the curved portion of the strap elements 78 and elements 82 pivotally connected to the bottom wall of the transition passage member 72, bolt assemblies 84 being provided for locking the elements 82 in place to secure the discharge assembly on the pivot member 76.

A manual control is provided for adjustably positioning the discharge assembly in its pivotal position. Accordingly, an anchor element 86 is fixed to the top wall of the transition passage member 72 to which a link element 88 is connected. A cable 90 is secured to the upper end of the link element 88 and passes around a pulley member 92 mounted on top of the hood assembly 60. The cable accordingly makes a 90° turn and passes over the pulley member 94 mounted at the upper end of the hood assembly the project forwardly therefrom. The cable 90 then extends downwardly under the pulley member 96 mounted on the front wall 38 for connection to the spout control lever 98. The lever 98 is therefore suitably pivotally mounted on the frame 12, and suitably locked in position as for example by a hydraulic control (not shown) on the tractor connected to the lever 98 by chain 99.

Referring once again to FIGURE 4, it will be observed that the conveyor assembly 56 includes a pair of endless conveyor chains 100 including an upwardly moving portion 102 supported by the partition wall 42 and a downwardly moving portion 104 located within the return space 46. The conveyor chains are accordingly entrained about a lower idler sprocket 106 rotatably mounted at a fixed location adjacent the lower end 50 of the hopper assembly. The sprocket element 106 is therefore disposed between the lower end of the partition wall 42 and the bottom end 50 of the hopper. A pair of idler guide sprockets 108 and 110 are rotatably mounted on the mounting members 52 associated with each of the sprocket chains 100. The idler sprockets 108 and 110 respectively engage the upwardly moving portion 102 and downwardly moving portion 104 of the endless chains 100 to guide movement thereof in fixed spaced relation to the hopper wall 44 below its upper edge. It will therefore be observed, that the endless chains 100 include transfer portions 112 which extend into the hood portion 68 and interconnect the upwardly moving and downwardly moving portions 102 and 104. Material displacing cleat members 114 are therefore connected between the chain members 100 in equal spaced relation to each other so as to move the material upwardly along the wall 42 to be transferred by the transfer portions 112 of the material moving sprocket chains either into the discharge assembly or recirculated back into the hopper chamber 48 for mixing purposes. It will therefore become apparent, that the degree to which the conveyor mechanism 56 is operative to transfer material 70 into the discharge assembly 66 will depend upon the position of the transfer portion of the endless chain. Accordingly, the position of the transfer portion 112 of the endless chain 100, is controlled by means of a transfer controlling mechanism generally referred to by reference numeral 116.

The transfer controlling mechanism 116 as shown by solid line in FIGURE 4, is operative to so condition the material conveying mechanism 56 as to cause recirculation only of the material for mixing purposes. The conveyor chains 100 pass over a drum member 118 so that the chain portions 112 extend therefrom in non-parallel relation. The rotational axis of the drum 118 in one limit position is tangentially aligned with the downwardly moving portion 104 of the conveyor chain 100 forming a straight path. When the drum 118 is displaced from this limit position as illustrated in solid line in FIGURE 4 to the limit position illustrated by dotted line in FIGURE 4, it will be tangentially aligned with the upwardly moving portion 102 of the conveyor chain to form a straight path and thereby transfer a substantial portion of the material 70 into the discharge assembly 66. Therefore, it will be apparent that by controlling the position of the rotational axis of the drum 118, the proportion of the material 70 recirculated and the proportion transferred to the delivery assembly 66 may be controlled. The rotational axis of the drum 118 is therefore displaced in an arc the center of which is substantially located between the idler sprocket elements 108 and 110 so that there will be substantially no dimensional change in the length of the chain constituting the transfer portion 112 between the sprocket elements 108 and 110. Also, the supporting partition wall 42 is provided with a pivotally displaceable section 120 which is hingedly mounted so that it will be displaced with the drum 118 and thereby provide support for all loaded portions of the conveyor chain 100 for all positions thereof.

As more clearly seen in FIGURE 5, the drum 118 is connected between sprocket wheels 122 that drivingly engage the sprocket chains 100. The sprocket wheels 122 are fixedly mounted on a drive shaft 124 that extends through arcuate slots 126 in the side walls of the hood portion 68. The arcuate slots 126 are dimensioned so as to accommodate arcuate displacement of the drive shaft 124 whereby the position of the drum 118 is varied for purposes hereinbefore indicated, and also to accommodate a certain amount of radial adjustment for the drive shaft. Continuation of the slot 126 is formed in the portion 72 of the discharge assembly 66 so as to enable the discharge assembly 66 to overlie the hood portion 68 by a certain amount.

Referring now to FIGURES 5 and 7 in particular, it will be observed that each axial end of the drive shaft 124, has a bearing assembly 127 mounted thereon which is connected to a lever assembly. One end of the drive shaft is connected to the upper end of an arm 128 of a lever assembly 130. The other arm 132 of the lever assembly 130 has a connecting rod 134 connected thereto by means of which the lever assembly 130 is controllably displaced with respect to a pivot bolt 136. The connecting rod 134 associated with the lever assembly 130 on the rear end of the hopper passes behind the foldable panel 62 as seen in FIGURE 1 for connection to a lever member 138. A connecting rod 140 is connected to the lever assembly 142 to the lever assembly 130 and to a lever member 144 on the front side of the hopper as seen in FIGURE 3. The lever members 138 and 144 are interconnected with each other and in turn are connected to a control lever 146. Accordingly, the angular position of the lever assemblies 130 and 142 that journal the opposite axial ends of the drive shaft 124, may be controlled by means of the control lever member 146 which mounts a releasable detent mechanism 148 that cooperates with a fixed sector gear 150 mounted on the front wall 38 of the hopper. Also radial adjustment of the drive shaft 124 is accommodated by adjusting the position of pivot bolts 136 are mounted on the lever arm portions 152 which extend from the pivot member 76. An adjustment bolt member 154 threadedly engaged with nut element 156 fixed to the angle frame member 158 on the rear wall 40 of the hopper is thereby operative by engagement with the lever arm 152, to adjustably position the pivot bolts 136.

Referring now to FIGURES 7 and 8, it will be observed, that a sealing plate member 160 may be disposed on the outside of the side walls of the hood portion 68 for movement over the slot 126 in order to prevent the loss of material therethrough. The seal plate member 160 is therefore urged against the side walls of the portion 68 by means of spring 162 disposed about the projecting axial ends of the drive shaft 124 between the plate 160 and the bearing assemblies 127. Accordingly, the plate 160 is carried with the drive shaft 124 as the drum 118 is displaced therewith. Connected adjacent the other end of the plate 160 is a post element 164 to which spring 166 is anchored, the other end of the spring being anchored to the connecting rod 134 by the projecting element 168. Accordingly, the seal plate members 160 will be maintained in proper position over the slot 126 for all positions of the lever assembly 130.

Referring now to FIGURES 3 and 5 in particular, it will be observed that one axial end of the drive shaft 124 has connected thereto the drive sprocket wheel 170. The sprocket wheel 170 is drivingly connected by means of the sprocket chain 172 to the sprocket wheel 174 fixed to the belt pulley 176. Pivot bolt 178 also constitutes the adjustable pivot axis for the lever assembly 142 and is accordingly adjustably mounted on the arm portion 180 of the tubular pivot member 76 for adjustment as described with respect to the arm 152 hereinbefore. The pulley wheel 176 is drivingly connected by a belt drive 182 entrained about an input pulley wheel 184 mounted adjacent the lower end of the hopper forwardly of the front wall 38 thereof. Referring therefore to FIGURES 2 and 9 in particular, it will be observed that the pulley wheel 184 is connected to an extensible shaft 186 rotatably mounted in a sleeve bearing assembly 188 that is adjustably positioned by means of bolts 190 and bearing plate 192 on a vertical post member 194. The shaft assembly 186 is connected by a universal coupling 196 to the power take-off shaft 18 extending rearwardly from the towing vehicle 16. The belt drive 182 may thereby be adjustably tensioned by adjusting the vertical position of the input shaft 186. Also, it may be desirable to mount on the lever assembly 142 between the lever arms thereof, a chain guide block for the endless chain drive 172 in order to maintain said chain under the proper slack condition. It will therefore be apparent, that an effective drive will be imparted to the material conveying mechanism 56 at its upper end through the transfer mechanism 116.

It will be observed that the discharge assembly 66 as illustrated in FIGURES 1 through 9 includes a tubular conduit 196 fixed to the outlet end 198 of the transition passage portion 72. The material transferred to the discharge assembly may thereby be directly deposited within any suitable receiver. Under certain circumstances however, it may be necessary or desirable to provide means for unloading the material in connection with other types of receivers. Referring therefore to FIGURE 10, it will be observed that the tubular conduit 196 has been replaced by an attachment generally referred to by reference numeral 200 which involves an upwardly inclined auger type conveyor mechanism 202 by means of which the discharged material is conveyed upwardly and out of the extended discharge outlet 204. Belt gearing 206 may therefore be provided between separate pulley 185 on shaft 186 and driven pulley 208 geared to the driving end of a swivelly mounted auger mechanism 204. When so used, the transition passage portion 72 of the discharge assembly must be held in fixed position by means of the frame members 210 in order to maintain the belt drive 206 under driving tension. The arrangement of FIGURE 10 thereby extends the point of material discharge away from the discharge side of the hopper. It may under certain circumstances be desirable to extend the discharge point for the material in a lateral direction with respect to the hopper. Accordingly, as shown in FIGURE 11 a modified form of discharge assembly 212 is utilized replacing the transition passage portion 73. The discharge assembly 313 includes therefor, at its lower end, an upwardly inclined auger type conveyor mechanism 214 terminating at an outlet end 316 in laterally spaced relation to the hopper assembly 26. The lower inclined end of the auger mechanism 214 is therefore provided with the pulley wheel 216 drivingly connected to the input shaft 186 through belt gearing 218.

From the foregoing description, the operation and utility of the feeder and mixer device of the present invention will be apparent. It will therefore be appreciated, that both feeding and mixing of material from a single hopper compartment or chamber 48 may be accomplished through a relatively simple power drive arrangement and that a unique control is provided whereby the degree of mixing may be varied so as to suit the type of material being utilized and the requirements associated therewith. The feeder and mixer is accordingly well suited for silage material which because of its poor fluent properties, requires accurate yet sometimes variable angle of incline with respect to the material displacing conveyor in order to obtain the proper rate of discharge of the silage. The apparatus may however be rendered useful in connection with grain by use of discharge arrangements as illustrated in FIGURES 10 and 11 which extend the outlet point of the material for more convenient reception by a grain receiver.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A silage feeder and mixer combination comprising, hopper means, delivery means operatively mounted on the hopper means for directing deposit of material from the hopper means, conveyor means movably mounted within the hopper means and continuously moving material for partial recirculation within said hopper means and transfer into the delivery means, said conveyor means including a rotor having a rotational axis mounted adjacent said delivery means, and displacing means operatively connected to the rotor for shifting the same between a position wherein a maximum recirculation of the material is attained and another position wherein a maximum rate of transfer of the material to the delivery means is attained.

2. The combination of claim 1, wherein said conveyor means includes endless transmission means having an upwardly moving portion, a downwardly moving portion and a transfer portion, supporting wall means mounted within said hopper means adjacent one side thereof for support of said upwardly moving portion, idler wheel means fixedly mounted adjacent a bottom end of the hopper means and spaced idler wheel means mounted at an upper end of the hopper means adjacent the delivery means for driving engagement with said transmission means, a plurality of spaced cleats mounted on said transmission means, said transfer portion of the transmission means being operatively engaged with the rotor above said upper end of the hopper means for displacement thereby without any substantial change in linear dimension.

3. The combination of claim 2 wherein said supporting wall means includes a section displaceable with the said rotor for continuous support of loaded portions of the conveyor means.

4. The combination of claim 3, wherein said displacing means comprises hood means mounted above said upper end of the hopper means, and further including control means operatively connected to said rotor for displacement therewith of said transfer portion between positions in tangential alignment with said upwardly and downwardly moving portions of the conveyor means.

5. The combination of claim 4, wherein said delivery means comprises transition passage means having an inlet end and an outlet end, pivotal supporting means interconnecting said passage means to said upper end of the hopper means, positioning means operatively connected to said passage means for displacement of the inlet end thereof relative to the hood means, and delivery conduit means connected to said outlet end of the passage means, said rotor being adjustably mounted by said pivotal supporting means.

6. The combination of claim 5, including panel means movably mounted above the hopper for vertical extension thereof in alignment with said hood means and foldable downwardly for loading of the hopper means.

7. The combination of claim 6, including a delivery conveyor connected to said conduit means and displaceable with said passage means.

8. The combination of claim 1, wherein said delivery means comprises transition passage means having an inlet end and an outlet end, pivotal supporting means interconnecting said passage means to said upper end of the hopper means, positioning means operatively connected to said passage means for displacement of the inlet end thereof relative to the hood means, and delivery conduit means connected to said outlet end of the passage means, said rotor being adjustably mounted by said pivotal supporting means.

9. The combination of claim 1, wherein said displacing means comprises hood means mounted above the hopper means for movably mounting said rotor.

10. The combination of claim 9, including panel means movably mounted above the hopper means for vertical extension thereof in alignment with said hood means and foldable downwardly for loading of the hopper means.

11. A material mixing and feeding apparatus comprising, material storage means having an outlet opening, material discharge means operatively connected to the material storage means for directing discharge of material from said outlet opening, conveyor means operatively mounted within the storage means for movement of material toward said outlet opening along a fixed path within said storage means, said conveyor means having a rotor and an adjustable transfer portion engaged by the rotor for recirculation of material in the storage means and transfer thereof to the outlet opening along an adjustable path and regulating control means operatively connected to the rotor for displacement thereof between limit positions respectively providing maximum recirculation of the material and transfer of the material to the outlet opening.

12. A material mixing and feeding apparatus comprising, a hopper having upwardly diverging walls for storing material therein, discharge means connected to an upper edge of one of said diverging walls for directing discharge of material from the hopper, conveyor means mounted within the hopper adjacent to said one diverging wall for movement of material toward the discharge means, said conveyor including a drum, a lower end fixedly mounted within the hopper, an upper end displaceably mounted by the drum above said upper edge of said one diverging wall, material moving means movably mounted between said lower and upper ends, and means for guiding movement of the material moving means along a path fixedly spaced from said one diverging wall below said upper edge thereof, means movably mounting said drum for displacement of the material moving means above the upper edge of said one diverging wall toward or away from the discharge means to vary the proportion of material returned to the hopper for recirculation, and means operatively connected to the drum for displacement thereof between limit positions at which the maximum rates of material recirculation and transfer to the discharge means are attained.

13. The apparatus as defined in claim 12 wherein said material moving means includes an endless conveyor belt having upper and lower runs extending between the lower and upper ends of the conveyor means, the upper run including a transfer portion between the guiding means and the upper end disposed in non-parallel relation to the lower run, said upper end in one of said limit positions of the drum forming a straight path between the upper and lower ends of the conveyor means.

References Cited by the Examiner

UNITED STATES PATENTS

| | | | |
|---|---|---|---|
| 1,213,971 | 1/17 | Swarner | 198—117 |
| 1,480,470 | 1/24 | Rosenberg | 198—118 X |
| 3,044,640 | 7/62 | Jamison | 214—83.36 |

FOREIGN PATENTS 1,063,363   8/59   Germany.

RAPHAEL M. LUPO, *Primary Examiner.*

LOUIS J. DEMBO, *Examiner.*